United States Patent [19]

Price et al.

[11] Patent Number: 4,965,552

[45] Date of Patent: Oct. 23, 1990

[54] ELECTRONIC ANIMAL REPELLANT APPARATUS

[76] Inventors: Charles S. Price, 312 Parkview Dr., Louisville, Ky. 40223; John O. Adams, 1212 Wieble Rd., Crestwood, Ky. 40014

[21] Appl. No.: 380,892

[22] Filed: Jul. 17, 1989

[51] Int. Cl.[5] ........................ H04B 1/02; G08B 15/00
[52] U.S. Cl. ................................... 340/566; 340/573; 367/139
[58] Field of Search ................. 340/573, 566; 367/139

[56] References Cited

U.S. PATENT DOCUMENTS

| | | | |
|---|---|---|---|
| 2,806,082 | 9/1957 | Woods | 73/648 |
| 3,113,304 | 12/1963 | Lindley | 340/384 R |
| 4,219,884 | 8/1980 | DeSantis | 367/139 |
| 4,306,228 | 12/1981 | Meyer | 340/566 |
| 4,625,083 | 11/1986 | Poikela | 379/389 |
| 4,656,770 | 4/1987 | Nuttle | 43/2 |
| 4,658,386 | 4/1987 | Morris | 367/139 |
| 4,706,069 | 11/1987 | Tom et al. | 340/541 |
| 4,769,794 | 9/1988 | Beuter et al. | 367/139 |

Primary Examiner—Glen R. Swann, III

[57] ABSTRACT

An electronic animal repellant apparatus includes a microphone for detecting environmental sound, a detection circuit for detecting the presence of a particular species of animal in the vicinity of the repellant apparatus, a timing and activation circuit, and a plurality of animal repellant or frightening devices. The microphone produces an input signal fed to the detection circuit that has a frequency content representative of the frequency spectrum of the environmental sound. The input signal is compared to a pre-determined frequency envelope characteristic of the sound spectrum of the particular animal species and a trigger signal is produced when the presence of the particular animal is detected. The detection circuit includes a band-pass filter and a negative feedback band-reject filter, each having readily removable and replaceable components for changing the pre-determined frequency envelope for different species of animal to be repelled. The trigger signal is provided to the timing and activation circuit which provides signals to activate one or more of the plurality of animal frightening devices. The timing and activation circuit includes circuitry to provide a random delay in activation of the frightening device, a random duration of activation, and a random sequence of activation of more than one of the plurality of devices.

17 Claims, 6 Drawing Sheets 4,965,552

ELECTRONIC ANIMAL REPELLANT APPARATUS

BACKGROUND OF THE INVENTION

The present invention concerns apparatus for detecting the presence of a particular animal and for triggering devices adapted to repel or frighten the animal. More particularly, the present invention concerns an electronic animal repellant apparatus that is capable of distinguishing the sound of a particular species of animal from ambient environmental conditions.

Possibly the earliest form of animal repellant apparatus is the traditional scarecrow. Other later devices have utilized the same principle of providing an image that naturally repels birds and other animals. However, as the animals became accustomed to the presence of the scarecrow repellant apparatus, it became increasingly less effective at performing its appointed function. Consequently, those in the art have turned to devices that detect the presence of animals within the vicinity of an area to be protected, and that actuate a single repellant device, such as a loud blast, or some visual display designed to evoke panic or fear in the animal to be repelled. Other animal repellant apparatus of the prior art rely upon periodic generation of noises or sounds that have a tendency to frighten animals.

However, there remains a need for a device which detects the presence of the offending animal species, and then triggers the operation of a variety of different repellant devices in a random fashion to prevent the offending animals from becoming accustomed to the repellant apparatus. In addition, there is also a need for such a device that requires little human intervention for its operation and that is actuated only as often as necessary to perform its animal repellant function.

SUMMARY OF THE INVENTION

These and other benefits and advantages are afforded in the provision of an electronic animal repellant apparatus which includes a detector circuit for sensing the presence of an animal in the vicinity of the apparatus and for producing a trigger signal in response thereto. A signal generator generates an output signal sensible by the animal and adapted to repel the animal. An activation circuit is provided for activating the signal generator in response to the trigger signal in which the activation of the signal generator is delayed for a random period of time after receipt of the trigger signal to minimize the ability of the animal to become accustomed to the output signal.

In another aspect of the invention, the signal generator can be adapted to selectively generate at least two different output signals, each of which is sensible by the animal and adapted to repel the animal. The activation circuit can be adapted to randomly select one of the different output signals for generation by the signal generator in response to the trigger signal.

In a further aspect of the invention, the detector circuit includes a microphone circuit for sensing sound signals and for producing an input signal having a frequency content representative of the frequency spectrum of the sound signals. The detector circuit further includes comparison circuitry for receiving the input signal and for comparing the frequency content of the input signal with a pre-determined frequency envelope characteristic of the sound spectrum of the particular species of animal. The comparison circuitry includes a filter circuit defining the pre-determined frequency envelope and having readily removable and replaceable components for changing the pre-determined frequency envelope. The trigger signal is produced when the comparison of the input signal with the pre-determined frequency envelope indicates the presence of the particular species of animal in the vicinity of the detector.

In still a further aspect of the invention, the comparison circuitry includes means for comparing the spectral energy of a first portion of the input signal having a frequency content within the pre-determined frequency envelope, with the spectral energy of the remaining portion of the input signal having a frequency content outside the frequency envelope. The trigger signal is produced when the spectral energy of the first portion exceeds a pre-determined value relative to the spectral energy of the second portion.

A method of the invention for repelling an animal comprises the steps of determining a frequency envelope representative of the frequency content of sound signals produced by the animal and sensing sound signals in the vicinity of an animal repellant device. The respective spectral energies of a first portion of the sensed sound signals having a frequency content within the frequency envelope and of the remaining portion of the sensed sound signals having a frequency content outside the frequency envelope are determined and compared. An animal repellant device is activated when the spectral energy of the first portion exceeds a pre-determined value relative to the spectral energy of the remaining portion. Other features and aspects of the present invention, as well as their benefits over the prior art, will be apparent from the following written description and accompanying drawings.

DESCRIPTION OF THE PREFERRED EMBODIMENT

Figure 1:
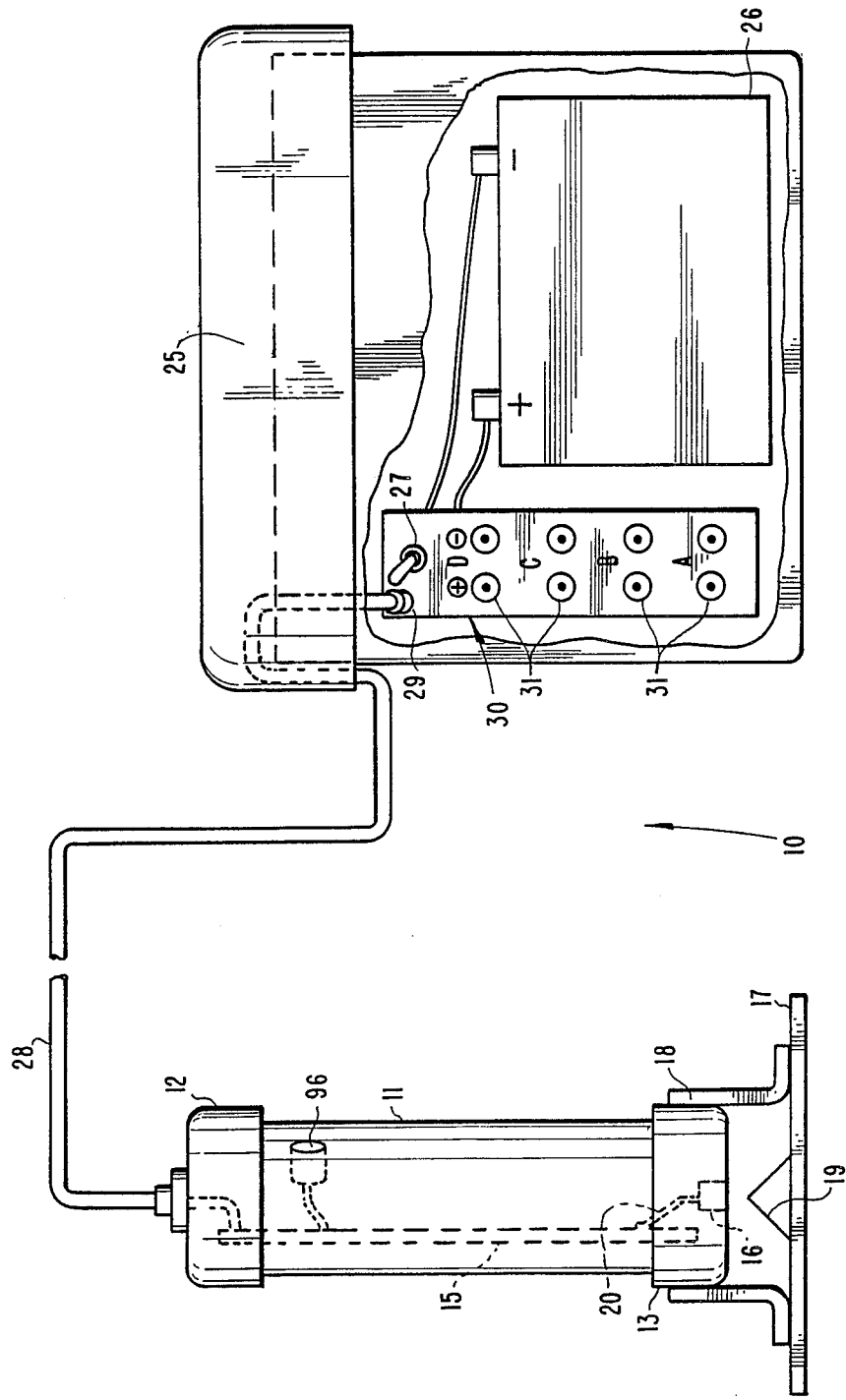
FIG. 1 is a side pictorial view of the animal repellant apparatus of the present invention shown without particular animal frightening or repellant devices connected.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 depicts the animal repellant apparatus 10 of the present invention comprises a housing 11 that is preferably a tubular or hollow cylindrical shape. The housing 11 includes a pair of end caps 12 and 13 that fully enclose the hollow interior of the housing. Mounted within the housing 11 is a circuit board 15 that contains the electronic components of the apparatus 10. Mounted on the side of the housing is a photo conductive cell 96 which monitors ambient light and controls power to circuit board 15. Mounted in one end cap 13 of the housing is a microphone 16 that is preferably an electret condenser microphone. The microphone 16 is configured to sense environmental sounds within a broad radius from the animal repellant apparatus 10.

In order to enhance the ability of the microphone 16 to monitor the environmental sounds, the housing 11 is mounted on a sound board 17 by a number of legs 18. The legs 18 maintain the position of the microphone 16 at a specific height above the sound board 17, calibrated to increase the amount of reflective sound received by the microphone. To still further improve the reception capabilities of the microphone 16, a cone 19 is mounted on the sound board 17 directly beneath the microphone 16. Thus, environmental sound is reflected off the cone 19 directly to the microphone 16. The microphone 16 is electrically connected to the circuit board 15 by a cable 20 which includes a power, a ground, and an output line.

The animal repellant apparatus 10 further includes an auxiliary box 25 which houses a battery 26. In one preferred embodiment, the battery is a 12 volt battery, such as is typically provided for automotive use. The power switch 27 controls the flow of electrical power from the battery 26 to the electronic circuitry 15. The power supply cable 28 is connected from the battery 26 to the electronic circuit board 15 by way of a connector 29. Also housed within the auxiliary box 25 is a connection panel 30 including a number of connection points 31A-31D for providing electrical connection to a number of animal frightening or repellant devices. For instance, one of the connection points 31A may be connected to a siren, while another of the connection points 31B may provide electrical connection to a mechanical frightening apparatus. Each connection point includes a power and a ground terminal to define, at least initially, an open circuit including the repellant device. The power cable 28 includes wiring to carry an activation signal from the circuit board 15 to the connection panel 30 to close the circuit between the battery and the particular device connection point.

Figure 2:
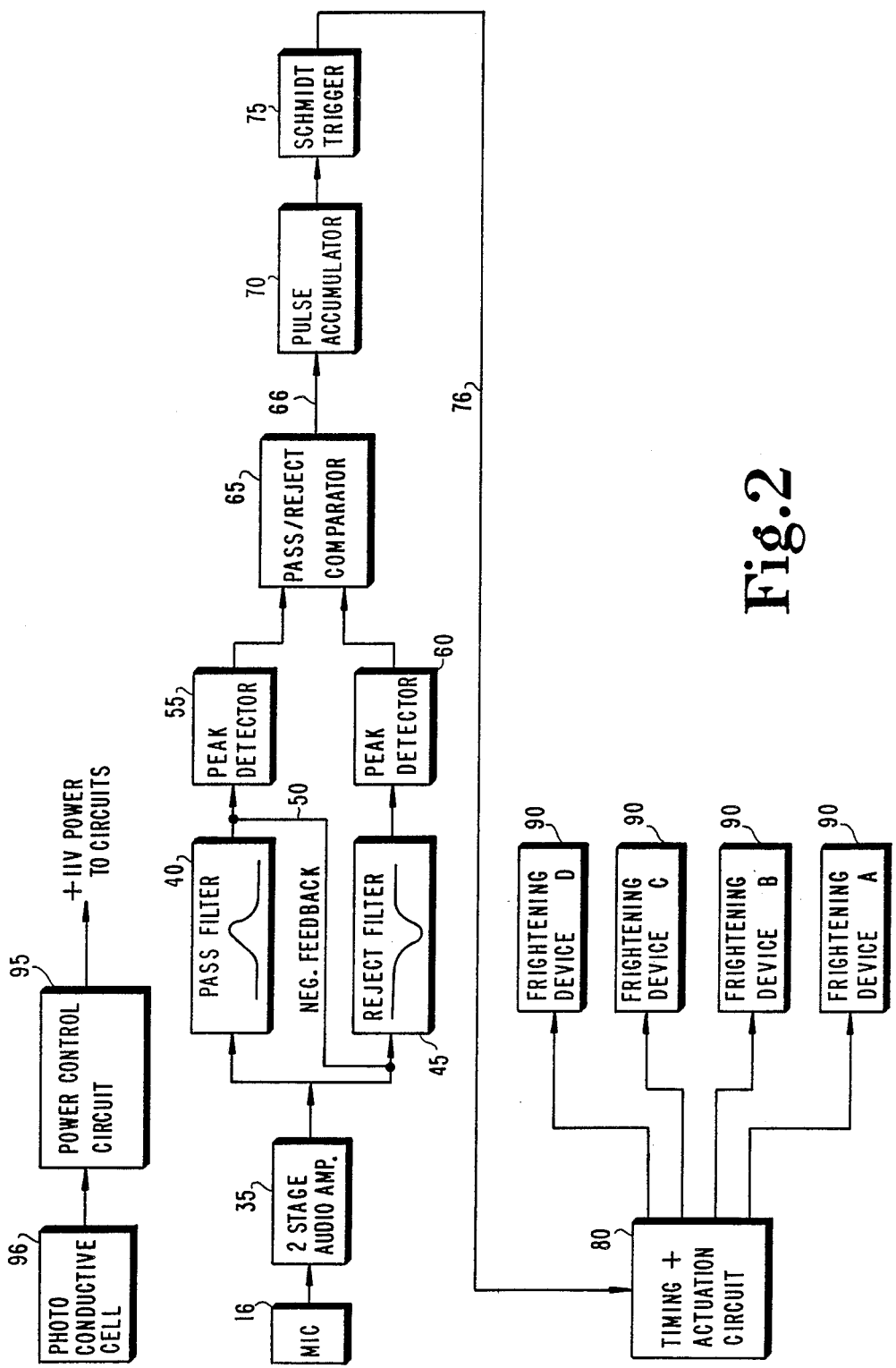
FIG. 2 is a functional block diagram of the electronic circuitry of the present invention.

The basic components of the animal repellant apparatus of the present invention are illustrated in the functional diagram of FIG. 2. The output signal from the microphone 16, representative of the sensed sound, is fed through a two stage amplifier 35 to a band-pass filter 40 and a band-reject filter 45. A negative feedback connection 50 is provided from the output of the band-pass filter 40 to the input of the band-reject filter 45. The input to the band-reject filter 45, then, is the superposition of the output from the two stage amplifier 35 and the negative feedback 50. The outputs from each of the filters 40 and 45 are fed to a pair of peak detectors 55 and 60, respectively. The outputs from the peak detectors 55 and 60 are provided to a comparator 65 which generates an output pulse signal 66 when the particular species of animal has been detected. The pulse signal 66 is supplied to a pulse accumulator 70 which accumulates a number of pulse signals before its output is released to a Schmidt trigger 75. The Schmidt trigger 75 generates an activation signal 76 to actuate the timing and activation circuit 80. The timing and activation circuit 80 provides the random delay for activation of any of the frightening devices 90A-D, the random duration of activation of the devices, and the random sequence in which the several devices are actuated. Power from the 12 volt batter 26 is provided to the electronic components mounted on the circuit board 15 through a power control circuit 95. The power control circuit 95 is responsive to the state of a photo conductive cell 96 to permit the flow of electricity to the components generally only during the daylight hours.

Figure 3:
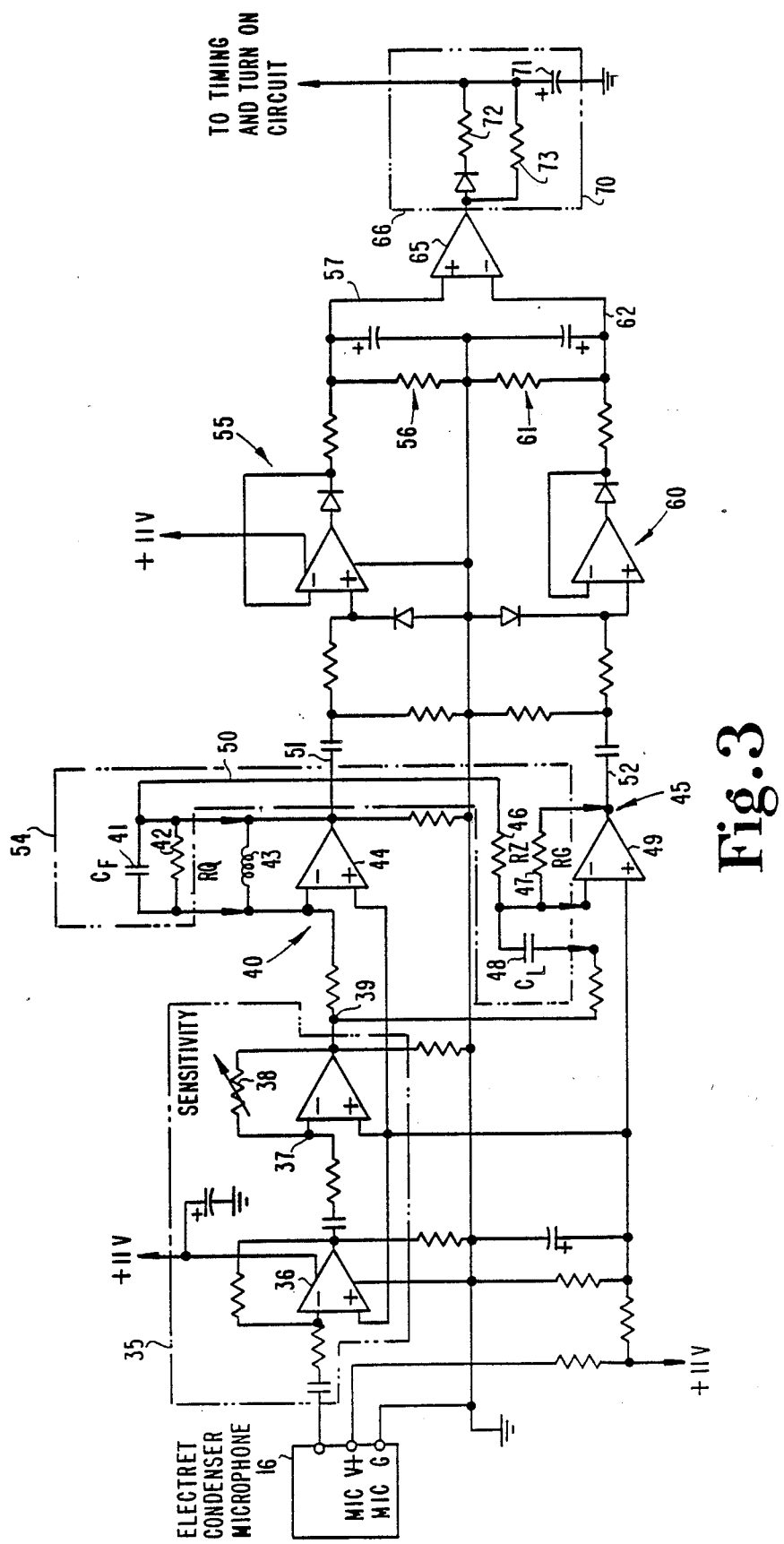
FIG. 3 is a circuit diagram of the detection circuit of the animal repellant apparatus of the present invention.
Figure 4:
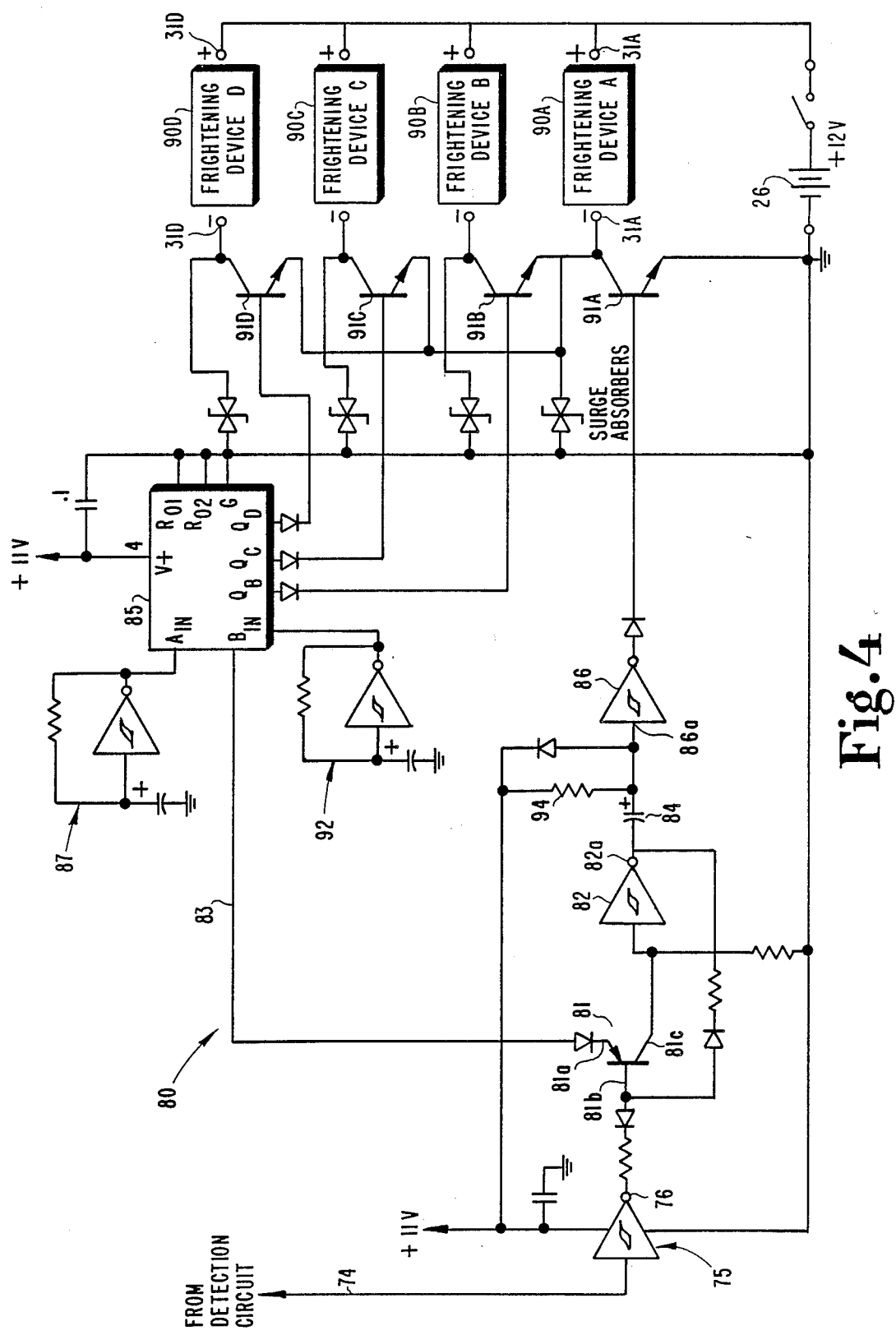
FIG. 4 is a circuit diagram of the timing and activation circuit of the animal repellant apparatus.
Figure 5:
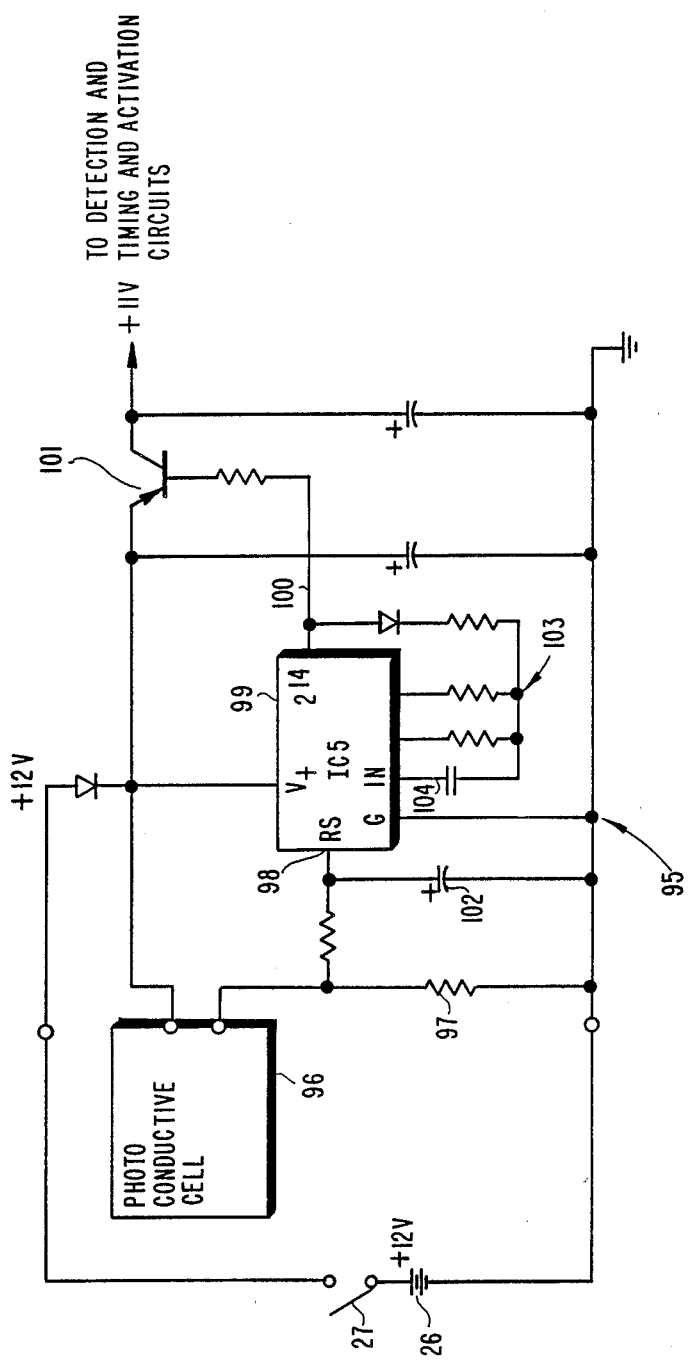
FIG. 5 is a circuit diagram of the power control circuit for the present invention.

Referring now to FIGS. 3-5, the specific circuits comprising the electronic animal repellant apparatus 10 are described. Output from the microphone 16 is fed to a first amplifier 36 of the two stage amplifier 35. The output from the first amplifier stage 36 is connected to the input of a second amplifier stage 37 which includes a variable resistor 38 in the feedback loop of the amplifier. The variable resistor 38 is preferably a potentiometer that is adapted to adjust the voltage gain of the two stage amplifier 35 from zero to approximately 1800. The variable gain second stage amplifier permits changes in the sensitivity of the microphone 16 so that the range of detection can be varied.

The output 39 from the two stage amplifier 35 is connected in parallel to the band-pass filter 40 and the band-reject filter 45. The band-pass filter 40 comprises an RLC active filter which includes a capacitor $C_F$, or capacitor 41, chosen to provide a desired center frequency, and a resistor $R_Q$, designated as resistor 42, selected to provide a desired band width about the center frequency. The capacitor and resistor components $C_F$ and $R_Q$ are chosen to best approximate a band-pass which matches the spectral frequency envelope of the sound made by the particular animal species, as well as the shape of that envelope.

An inductor 43 is also part of the RLC active filter and is selected to permit matching the resistor and capacitor components of the band-pass filter 40 with the components of the band-reject filter 45 in order to achieve an optimum ratio between the peak gain of the band-pass filter and the gain of the band-reject filter. Negative feedback 50 from the band-pass filter 40 is provided to the band-reject filter 45 through a feedback resistor $R_Z$, alternatively designated as resistor 46. The resistor $R_Z$ is selected so that the band-reject filter 45 provides a minimum output at the center frequency of the band-pass filter 40. The gain of the band-reject filter 45 is determined by a gain resistor $R_G$, or resistor 47. The output of the band-pass op amp 44 produces the negative feedback supplied to the band-reject filter 45.

Figure 6:
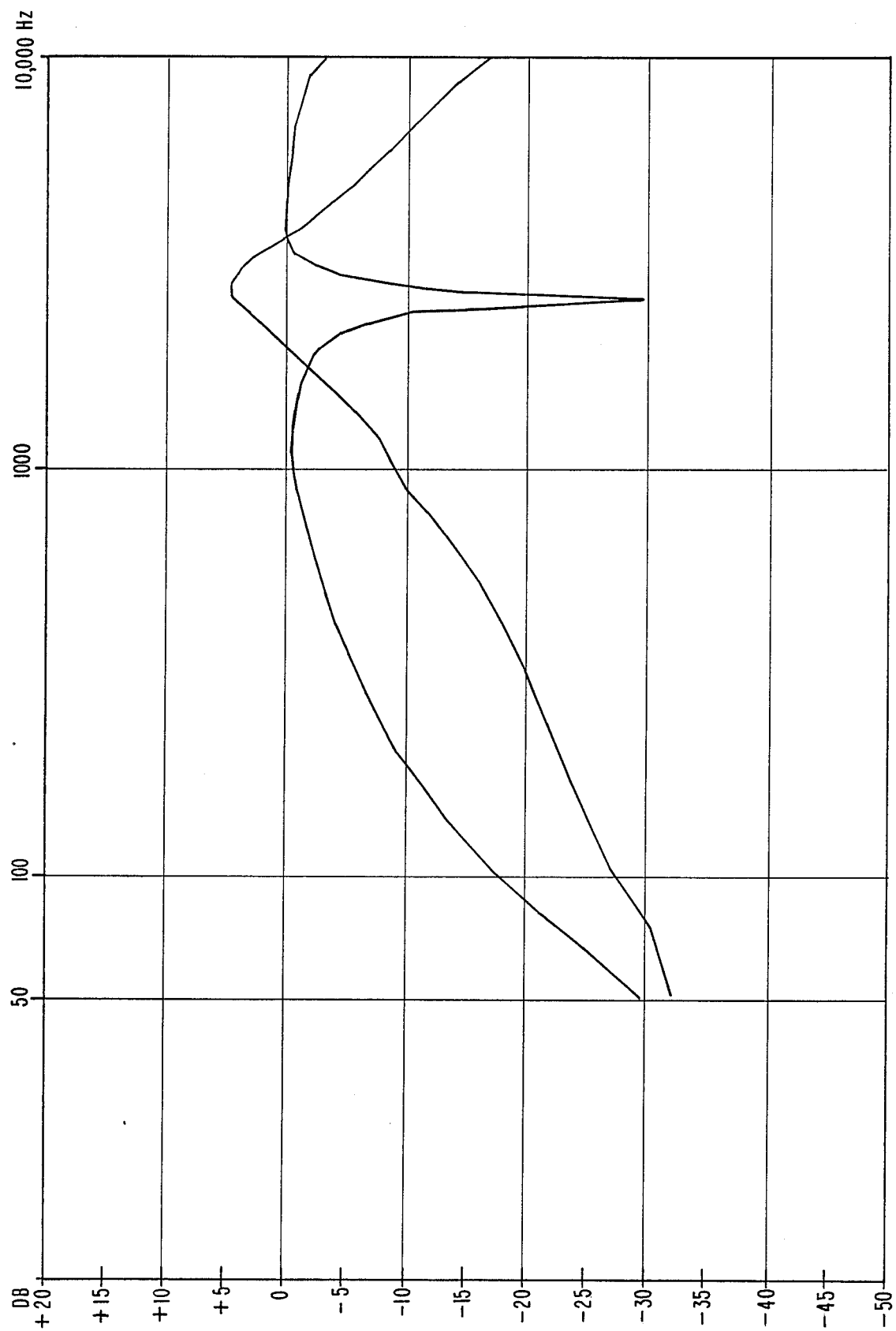
FIG. 6 is a graphical illustration of the frequency response of the band-pass and band-reject filters in one embodiment of the present invention configured for use in the detection of starlings.

The output 39 from the two stage amplifier 35 is connected to the input of the band-reject filter 45 through a low frequency cutoff capacitor $C_L$, designed as capacitor 48. The cutoff capacitor $C_L$ eliminates the low frequency noise or rumble from the environmental signal received by the microphone 16. The output from the two stage amplifier 35 is combined with the negative feedback 50 from the band-pass filter 40 and fed to the inverting node of the op amp 49 to produce an output signal 52 that is essentially the asymmetrical mirror image of the output signal 51 from the band-pass filter 40. The frequency response for a preferred embodiment of the present invention is shown in FIG. 6. In this preferred embodiment, the frequency response of the band-pass filter 40 was empirically determined to correspond to the shape of the sound spectrum of the starling bird species.

In a novel aspect of the present invention, the principal components of the band-pass filter 40 and the band-reject filter 45 are mounted in a plug-in module designated generally as module 54 in FIG. 3. The center frequency capacitor $C_F$, the band width resistor $R_Q$, the feedback resistor $R_Z$, the gain resistor $R_G$, and the low frequency cutoff capacitor $C_L$ are all mounted on the plug-in module 54 which plugs into the circuit board 15. These components completely determine the response of the band-pass and band-reject filters. Thus, the animal species to be detected can be changed by simply changing the plug-in module.

The output 51 from the band-pass filter 40 and output 52 from the band-reject filter 45 are each connected to the input of respective peak detection circuits 55 and 60. Each of the peak detection circuits 55 and 60 determine, in essence, the spectral energy within the frequency envelopes of the band-passed signal 51 and the band-rejected signal 52. Connected to the output of each of the peak detection circuits 55 and 60 is a parallel RC circuit, 56 and 61 respectively, to provide a slow discharge rate for the output signals from the peak detectors. This allows for the detected peak signals from the band-pass filter and the band-reject filter to be compared at the inputs to the comparator 65. If the peak voltage of the output signal 57 from the band-pass peak detector 55 is greater than the peak voltage of the output signal 62 from the band-reject peak detector 60, then the output 66 from the comparator 65 goes high. That is, if the spectral energy under the species detection band-pass envelope is greater than the spectral energy under the ambient sound frequency envelope, a high output pulse 66 is generated by the comparator 65. If, on the other hand, the ambient sound energy is greater than the detected sound energy of the desired animal species, the output 66 goes low. The gains of the band-pass and band-reject signals are adjusted so that the output pulse 66 goes high only when the spectral energy under the species detection frequency envelope exceeds a pre-determined value relative to the ambient sound frequency envelope.

The comparator pulse 66 is provided to a pulse accumulator 70, since the output from the comparator may jump quickly between high and low, depending on the nature of the detected sound. The pulse accumulator 70 includes two series RC circuits, one with a charging time constant determined by the resistor 72 in conjunction with the capacitor 71, and the second with a discharging time constant that is determined by the resistor 73 in conjunction with the capacitor 71. In the preferred embodiment, the charging time constant is one tenth of the discharge time constant. Thus, the capacitor 71 accumulates high comparator pulses 66 from the comparator as a voltage on the capacitor. When the capacitor 71 is charged to a high output level, the Schmidt trigger 75 (FIG. 4) produces a low output signal 76 that is fed into the timing and activation circuit 80. A low output 76 indicates that the sound of the desired species has been detected and that the sequence for actuating the frightening devices is to be initiated, that is the low output 76 is the trigger voltage for the timing and activation circuit.

Referring to FIG. 4, the timing and activation circuit 80 includes means for delaying the activation of the frightening devices, for randomizing the duration of activation, and for actuating the devices in a random sequence. The random delay of activation is controlled by the transistor 81 and the Schmidt trigger 82. The emitter node 81a of the transistor 81 is cycled from low to high at a period determined by the counter output 83 from the integrated circuit 85, which can be of well-known type, such as the MM74C93 counter sold by National Semiconductor. When the emitter of transistor 81 is low, the low trigger signal 76 has no effect and the activation circuit is inactive. However, when the emitter 81a of the transistor 81 goes to high, the low voltage of trigger signal 76 applied to the base 81b of the transistor produces a high voltage at the collector 81c of the transistor. The high at the transistor collector 81c is inverted to a low at the output 82a of the Schmidt trigger 82, which output is fed back to the base of 81b of the transistor 81 to latch the transistor in its "on" state until the emitter 81a is cycled to a low voltage.

The counter output 83 from the integrated circuit 85 is cycled from low to high at a period of about 100 seconds, in the preferred embodiment. Thus, when the low output trigger 76 is produced by the detection circuit, a random time delay is invoked until the counter output 83 cycles to a high voltage. Since the counter output 83 cycles over its 100 second period irrespective of the generation of the trigger output 76, the activation of the timing and activation circuit 80 is delayed by a random time period. The low output 82a from Schmidt trigger 82 is immediately fed to Schmidt trigger 86 input 86a through series capacitor 84. Resistor 94 then slowly charges capacitor 84 to produce a high input 86a to Schmidt trigger 86. In the preferred embodiment, the time constant of the capacitor 84 is approximately 20 seconds. It is this time constant which determines the maximum time delay of actuation. The low input signal 86a is inverted by Schmidt trigger 86 to produce a high (base current) at the base of the transistor 91A, which defines part of the circuit including the first connection point 31A. The high at the base of transistor 91A closes the circuit to provide power from the battery 26 to the device 90A connected to connection point 31A. It should be noted, however, that if during the activation of the transistor 91A for frightening device 90A the voltage at emitter 81a of transistor 81 goes to the low state, transistor 91A becomes non-conductive and, consequently, frightening device 90A is immediately deactivated. Thus, the 100 second time period counter output 83 also provides for a random duration of activation for the particular frightening device.

The 100 cycle counter output 83 is derived from a Schmidt trigger oscillator circuit 87 that provides a 50 second cycle signal to the counter of the integrated circuit 85. The counter output of the integrated circuit 85, then, is the 100 second time period counter output 83 fed to the emitter 81a of the transistor 81.

A second Schmidt trigger oscillator circuit 92 is provided that generates a five second cycle signal, in the preferred embodiment, to a second counter of the integrated circuit 85. The second counter includes a number of counter outputs $Q_B$, $Q_C$ and $Q_D$, each of which are connected to the base of a respective transistor 91B-91D, which have their collectors connected to a corresponding connection point, 31B-31D, for frightening devices 90B-90D. The counter outputs $Q_B$, $Q_C$ and $Q_D$, have cycle times of approximately ten seconds, twenty seconds and forty seconds, respectively, in the preferred embodiment. When the transistor 91A for the frightening device 90A has been turned on, the secondary counter, driven by the second Schmidt trigger oscillator 92, randomly turns on the transistors 91B, 91C and 91D. When the transistors are randomly turned on, the frightening devices 90B-90D are correspondingly actuated. Thus, when transistor 91A has been turned on, indicating the presence of an offending animal species, the first frightening device 90A is turned on and maintained while the remaining frightening devices 90B-90D are randomly cycled on and off. Since the second counter of integrated circuit 85 runs continuously, the relative times of activation of each of the secondary frightening devices is random.

Thus, it is seen that the timing and activation circuit 80 provides three elements of randomness to the generation of signals from a number of frightening devices. Particularly, the activation is delayed a random time period once the presence of the offending animal species has been detected. Next, the duration of activation of any one of the frightening devices is randomized. Finally, the sequence of actuation of the secondary frightening devices 90B-90D is also randomized. Thus, it is apparent that virtually any animal species would be incapable of becoming accustomed to the random operation of the electronic animal repellant apparatus 10 of the present invention. It should be apparent that the operation of the apparatus 10 need not be completely random, as in a mathematical sense. It is sufficient that the randomness of the delay, duration and sequence of activation of the frightening devices be sufficiently random to prevent the animal from becoming accustomed to the operation of the apparatus 10.

The power control circuit of the present invention is illustrated with respect to the circuit diagram shown in FIG. 5. The photo conductive cell 96 is mounted in the cylindrical housing 11 (FIG. 1), to monitor the environmental outdoor light. The resistance of the photo conductive cell 96 changes in relation to the presence or absence of light on the cell. In the preferred embodiment, the resistance of the cell 96 changes from greater than 5 Megohms at night, to less than 140K ohms in daylight. The photo conductive cell is in series with a resistor 97 to define a voltage divider network which drives the reset line 98 of a 14 stage counter 99, such as a standard National Semiconductor CD4060BC counter. During the daylight hours, that is from dawn until dusk, the reset line 98 is held high due to the light on the photo conductive cell 96. Because the 140K resistance of the photo conductive cell is considerably smaller than the voltage divider resistor 97, the voltage drop across the cell is low and the voltage provided to the reset line 98 from the power supply is high. While the counter reset line 98 is high, the counter output line 100 is held at a low voltage, which keeps the transistor 101 turned on and supplying voltage from the battery 26 to the various electronic circuits of the animal repellant apparatus 10. The capacitor 102 is provided in parallel with the reset line 98 so that a high reset signal to the counter 99 is delayed by the time constant of the capacitor 102. This prevents resetting of the counter 99 due to brief light flashes after dusk.

At dusk, the resistance of the photo conductive cell 96 becomes greater than the voltage divider resistor 97 so that the voltage at the counter reset line 98 goes low. When the reset line goes low, the counter 99 starts counting. Self-oscillating circuit 103, composed of a resistor and capacitor network, supplies an input 104 to the counter 99 with a period of approximately 0.2 seconds in the preferred embodiment. The output 100 of the fourteenth stage of the counter 99 has a period of about one hour. Consequently, once the reset line goes low and the counter 99 starts, the counter output 100 stays low for approximately thirty minutes after counting starts at dusk. After thirty minutes, the counter output goes high, which stops the self-oscillating circuit 103 and turns off the transistor 101. When the transistor 101 is turned off, power from the battery to the detection, timing and activation circuits is cut off. The purpose of the thirty minute delay after dusk is to assure that the device will continue to operate until all roosting attempts of various species of birds have ceased.

At dawn, the resistance of the photo conductive cell 96 drops again so that the voltage at the reset line 98 goes high which resets the counter 99, and causes the counter output 100 to go to a low voltage, which turns on transistor 101 to provide power back to the electronic circuits of the apparatus. If continuous operation of the apparatus 10 is desired during both day and night, the input and output leads to the photo conductive cell 96 can be shorted.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An animal repellant apparatus comprising:
   detecting means for sensing the presence of an animal in the vicinity of the apparatus and for producing a trigger signal in response thereto;
   generator means for generating an output signal sensible by the animal and adapted to repel the animal; and
   activating means for activating said generator means in response to said trigger signal, said activating means including means for delaying the activation of said generator means for a random period of time after receipt of said trigger signal.

2. The animal repellant apparatus of claim 1, wherein:
   said activating means further includes means for activating said generator means for a random time duration once said generator means is activated in response to said trigger signal.

3. The animal repellant apparatus of claim 1, wherein:
   said generator means further includes means for selectively generating one of at least two different output signals each of which is sensible by the animal and adapted to repel the animal; and
   said activating means further includes means for randomly selecting at least one of said different output signals to be generated by said generator means in response to said trigger signal.

4. The animal repellant apparatus of claim 1 wherein:
   said detecting means, said generator means and said activating means each include an electrical circuit; and
   the animal repellant apparatus further comprises a power control circuit for providing electrical power to each of said electrical circuits, said power control circuit including means for withholding electrical power for a period of time determined by the presence or absence of daylight.

5. The animal repellant apparatus of claim 1, wherein:
   said detecting means includes;

a microphone for sensing environmental sound in the vicinity of the animal repellant apparatus;

means for reflecting the environmental sound to said microphone; and a detection circuit for determining the presence of sounds associated with a particular animal to be detected in the environmental sound.

6. The animal repellant apparatus of claim 5, wherein:

said means for reflecting includes a sound board disposed adjacent and apart from said microphone and arranged to reflect sound toward said microphone.

7. The animal repellant apparatus of claim 6, wherein:

said means for reflecting includes a reflective cone mounted on said sound board and arranged to reflect sound toward said microphone.

8. The animal repellant apparatus of claim 5, wherein said detecting means further includes means for adjusting the sensitivity of said detecting means to vary the range of environmental sounds in the vicinity of the animal repellant apparatus detected by said apparatus.

9. An animal repellant apparatus comprising:

detecting means for sensing the presence of an animal in the vicinity of the apparatus and for producing a trigger signal in response thereto;

at least two generator means each for generating an output signal which is sensible by the animal and adapted to repel the animal, and which is different between said generator means; and activating means for randomly activating at least one of said at least two generator means in response to said trigger signal, said activating means including means for varying the duration of activation of said at least one generator means for a random time duration so that said output signal is generated for said random time duration.

10. The animal repellant apparatus of claim 9 wherein:

at least said detecting means and said activating means each include an electrical circuit; and the animal repellant apparatus further comprises a power control circuit for providing electrical power to each of said electrical circuits, said power control circuit including means for withholding electrical power for a period of time determined by the presence or absence of daylight.

11. The animal repellant apparatus of claim 9, wherein: said detecting means includes;

a microphone for sensing environmental sound in the vicinity of the animal repellant apparatus;

means for reflecting the environmental sound to said microphone; and a detection circuit for determining the presence of sounds associated with a particular animal to be detected in the environmental sound.

12. The animal repellant apparatus of claim 11, wherein:

said means for reflecting includes a sound board disposed adjacent and apart from said microphone and arranged to reflect sound toward said microphone.

13. The animal repellant apparatus of claim 12, wherein:

said means for reflecting includes a reflective cone mounted on said sound board and arranged to reflect sound toward said microphone.

14. An animal repellant apparatus comprising:

detecting means for sensing the presence of a particular species of animal in the vicinity of the apparatus and for producing a trigger signal in response thereto, said detecting means including;

circuit means for sensing sound signals and for producing a second signal having a frequency content representative of the frequency spectrum of the sound signals;

comparison means for receiving said second signal and for comparing the frequency content of said second signal with a pre-determined frequency envelope characteristic of the sound spectrum of the particular species of animal, said comparison means including a filter circuit defining said pre-determined frequency envelope and having readily removable and replaceable components for changing said pre-determined frequency envelope; and means for producing said trigger signal when the comparison of said second signal with said pre-determined frequency envelope indicates the presence of the particular species of animal in the vicinity of said detecting means;

generator means for generating an output signal sensible by the particular species of animal and adapted to repel the animal; and activating means for activating said generator means in response to said trigger signal.

15. In an animal repellant apparatus having a generator for producing a signal sensible by and adapted to repel the animal, the improvement comprising:

means for sensing sound signals and for producing a first signal having a frequency content representative of the frequency spectrum of the sound signals;

comparison means for comparing the spectral energy of a first portion of said first signal having a frequency content within a pre-determined frequency envelope, with the spectral energy of the remaining portion of said first signal having a frequency content outside said frequency envelope, wherein said pre-determined frequency envelope is representative of the frequency content of the sound spectrum of the animal to be repelled, and further wherein said comparison means includes means for generating a trigger signal when the spectral energy of said first portion exceeds a pre-determined level in comparison with the spectral energy of said second portion; and activating means responsive to said trigger signal for activating the generator to repel the animal.

16. The animal repellant apparatus of claim 15, wherein said comparison means includes:

band-pass filter means for receiving as an input said first signal and for generating a second signal containing said first the portion of said first signal;

band-reject filter means for receiving as inputs said first signal and said second signal, and for combining said first and said second signals so as to generate a third signal containing said remaining portion of said first signal;

means for determining the spectral energy of said second signal and of said third signal; and means for producing a trigger signal when the spectral energy of said second signal exceeds a pre-determined level in comparison with the spectral energy of said third signal.

17. A method for repelling an animal comprising the steps of:

(1) determining a frequency envelope representative of the frequency content of sound signals produced by the animal;
(2) sensing sound signals in the vicinity of an animal repellant device;
(3) determining the spectral energy of a first portion of the sensed sound signals having a frequency content within the frequency envelope;
(4) determining the spectral energy of the remaining portion of the sensed sound signals having a frequency content outside the frequency envelope;
(5) comparing the two spectral energies;
(6) activating the animal repellant device when the spectral energy of the first portion exceeds a predetermined level in comparison with the spectral energy of the remaining portion.

* * * * *